United States Patent [19]

Chu et al.

[11] Patent Number: 5,693,694
[45] Date of Patent: Dec. 2, 1997

[54] LOW AND MEDIUM FLUX MEMBRANES

[75] Inventors: Chaokang Chu, Lexington, Mass.; Joseph F. Ferraro, Londonderry, N.H.; Ann L. Ly, Bedford, Mass.

[73] Assignee: W.R. Grace & Co.-Conn., New York, N.Y.

[21] Appl. No.: 618,709

[22] Filed: Mar. 20, 1996

[51] Int. Cl.$^6$ .................................................. C08K 5/3415
[52] U.S. Cl. .................. 524/104; 210/500.23; 264/145; 524/111; 524/173; 524/233
[58] Field of Search ........................ 524/104, 111, 524/173, 233

[56] References Cited

U.S. PATENT DOCUMENTS

| | | | |
|---|---|---|---|
| 3,558,764 | 1/1971 | Isaacson et al. | 264/210 |
| 3,859,252 | 1/1975 | Cho | 260/49 |
| 3,930,105 | 12/1975 | Christen et al. | 428/398 |
| 4,003,812 | 1/1977 | Scala | 524/99 |
| 4,051,300 | 9/1977 | Klein et al. | 428/398 |
| 4,055,696 | 10/1977 | Kamada et al. | 428/398 |
| 4,286,015 | 8/1981 | Yoshida et al. | 428/305 |
| 4,612,119 | 9/1986 | Eguchi | 210/500.23 |
| 4,772,391 | 9/1988 | Baker et al. | 210/490 |
| 4,787,976 | 11/1988 | Parham et al. | 210/500.23 |
| 4,802,942 | 2/1989 | Takemura et al. | 156/244.13 |
| 4,874,522 | 10/1989 | Okamoto et al. | 210/645 |
| 4,882,223 | 11/1989 | Aptel et al. | 428/398 |
| 4,882,489 | 11/1989 | Saotome et al. | 250/327.2 |
| 4,906,375 | 3/1990 | Heilmann | 210/500.23 |
| 4,935,141 | 6/1990 | Buck et al. | 210/500.38 |
| 4,938,778 | 7/1990 | Ohyabu et al. | 210/500.23 |
| 4,970,034 | 11/1990 | Ly et al. | 264/46.4 |
| 5,049,276 | 9/1991 | Sasaki | 210/500.23 |
| 5,096,585 | 3/1992 | Nguyen | 210/500.23 |
| 5,232,601 | 8/1993 | Chu et al. | 210/646 |
| 5,250,240 | 10/1993 | Kim et al. | 264/41 |
| 5,431,817 | 7/1995 | Braatz et al. | 210/490 |
| 5,578,676 | 11/1996 | Flaim | 524/261 |

OTHER PUBLICATIONS

Radovich, J.M., "Composition of Polymer Membranes for Therapies of End-Stage Renal Disease," *Dialysis Membranes; Structures And Predictions*, vol. 113, pp. 11–24, 1995.

*Primary Examiner*—Paul R. Michl
*Attorney, Agent, or Firm*—Fish & Richardson P.C.

[57] ABSTRACT

A casting solution for preparing a low to medium flux membrane. The casting solution contains 19–25% by weight polysulfone, polyethersulfone, or polyarylsulfone; 14–32% by weight a hydrophilic compatible polymer; 0.1–6% by weight an isocyanate capped polyethylene glycol urethane polymer; and 37–67% by weight an aprotic and water miscible solvent; in which the polysulfone, polyethersulfone, or polyarylsulfone has a M.W. of 10,000–100,000 daltons, the isocyanate capped polymer contains 2–5 —N=C=O groups per molecule and has a M.W. of 500–5,000 daltons, and the compatible polymer contains 2–5 —CH$_2$OH groups per molecule and has a M.W. of 200–1,000 daltons. Also disclosed are a method of spinning this casting solution to form a hollow fiber and the hollow fiber thus obtained.

14 Claims, No Drawings

LOW AND MEDIUM FLUX MEMBRANES

BACKGROUND OF THE INVENTION

The present invention relates to hollow fiber membranes which can be used in hemodialysis. These membranes are semipermeable and thus allow movement of small molecules (such as water and urea) across them, while preventing large molecules (such as proteins) from crossing.

Generally speaking, hemodialysis membranes can be categorized by their ultrafiltration coefficients into low flux, medium flux, and high flux membranes. The ultrafiltration coefficient of a hollow fiber membrane describes the permeability of the membrane to water, i.e., a certain amount of water which is ultrafiltered through the membrane of a given active surface area at a given transmembrane pressure in a given period of time. It is common to measure the ultrafiltration coefficient of a hemodialysis membrane in a simulated use condition in which bovine serum is circulated on the blood side of the hollow fiber membrane.

Backfiltration, which may occur to a dialyzer containing high flux membranes, can be minimized by use of low to medium flux membranes with ultrafiltration coefficients ranging from 2 to 25 ml/hr/mm Hg/m$^2$. Also, a dialyzer with an overall permeability of 8 ml/hr/mm Hg or higher must be operated with an ultrafiltration-controlled dialysis machine. For example, an average dialyzer having an active surface area of 1.33 m$^2$ and an ultrafiltration coefficient of 6 ml/hr/mm Hg/m$^2$ results in an overall permeability of 8 ml/hr/mm Hg, which requires an ultrafiltration controlled dialysis machine. There is no need for such a machine when using a dialyzer which is made of low or medium flux membranes and has an overall permeability of lower than 8 ml/hr/mm Hg.

SUMMARY OF THE INVENTION

An aspect of this invention relates to a casting solution for preparing a low to medium flux membrane. In general, the casting solution includes 19–25% by weight (preferably, 22–24% by weight) polysulfone, polyethersulfone, or polyarylsulfone; 14–32% by weight a hydrophilic compatible polymer; 0.1–6% by weight an isocyanate capped polyethylene glycol urethane polymer; and 37–67% by weight (preferably, 38–64% by weight) of an aprotic and water miscible solvent.

More specifically, the polysulfone, polyethersulfone, or polyarylsulfone has a molecular weight ("M.W.") of 10,000–100,000 daltons (preferably, 30,000–80,000 daltons; e.g., about 60,000 daltons, see Example 1 below). The hydrophilic compatible polymer contains 2-5 —CH$_2$OH groups per molecule and has a M.W. of 200–1,000 daltons (preferably contains 2-3 —CH$_2$OH groups per molecule and has a M.W. of 400–800 daltons; e.g., polyethylene glycol 600 which contains 2 —CH$_2$OH groups and has a M.W. of about 600). The isocyanate capped polymer contains 2-5 —N=C=O groups per molecule and has a M.W. of 500–5,000 daltons (preferably contains 2-3 —N=C=O groups per molecule and has a M.W. of 1,000–2,000 daltons; e.g., about 1,450 daltons, see Example 1 below), which can be prepared from a polymerization reaction between polyethylene glycol and toluene diisocyanate. Note that the composition of the casting solution described herein refers to the amounts of the components, each in its initial state, regardless of any reaction between two or more of the components. Indeed, to prepare a casting solution of the present invention, a reaction between the isocyanate capped polymer and the compatible polymer is always carried out first. See Example 1 below, which shows how a casting solution of this invention was prepared.

The above-described casting solution may have a viscosity of 2,000 to 10,000 centipoise ("cp") at 45° C. Preferably, the viscosity values range from 2,500 to 6,000 cp at 45° C.

Another aspect of this invention relates to a low to medium flux semipermeable hollow fiber produced by the following process which includes the steps of (1) providing a casting solution described above; (2) providing a coagulating solution; and (3) spinning the casting solution through a spinneret while simultaneously introducing through the central capillary (i.e., the nozzle capillary tube) of the spinneret the coagulating solution so as to form a hollow fiber, in which the ratio of the inner diameter of the hollow fiber to the outer diameter of the capillary is maintained at 0.6–0.9 (acceptable narrower ranges include, but are not limited to, 0.6–0.8 and 0.65–0.85).

The hollow fiber can be spun at 100–500 ft/min (e.g., 120–300 ft/min) from a casting solution which has a viscosity of 2,000 to 10,000 cp (e.g., 2,500 to 6,000 cp) at 45° C.

A further aspect of this invention relates to a low to medium flux semipermeable hollow fiber, (1) which contains polysulfone molecules, polyethersulfone molecules, or polyarylsulfone molecules, and linked polyethylene glycol molecules (e.g., linked to each other via urethane linkage); (2) which has the following characteristics: an internal diameter of 160–250 μm (e.g., 180–230 μm), a wall thickness of 25–70 μm (e.g., 35–55 μm), a bovine serum ultrafiltration coefficient of 2–25 ml/hr/mm Hg/m$^2$ (e.g., 2.5–18 ml/hr/mm Hg/m$^2$), and a saline clearance rate of 80–180 ml/min (e.g., 100–150 ml/min); and (3) the bovine serum ultrafiltration coefficients and clearance rates of which can be maintained (i.e., ±20%) after repeated fouling (i.e., buildup of material on the surface of the membrane which leads to clogging of the pores and decrease in permeability) and washing for nine times (i.e., at least nine times). The respective measurements of bovine serum ultrafiltration coefficients and saline clearance rates, as well as reuse after fouling and washing, are conducted in manners identical or analogous to those described in Example 1 and Example 4 below.

Also within the scope of this invention is a process for producing a semipermeable hollow fiber. The process includes the steps of: (1) providing a casting solution; (2) providing a coagulating solution; and (3) spinning the casting solution through a spinneret while simultaneously introducing through the central capillary of the spinneret the coagulating solution so as to form a hollow fiber, in which the ratio of the inner diameter of the hollow fiber to the outer diameter of the capillary is maintained at 0.6–0.9 (acceptable narrower ranges include, but are not limited to, 0.6–0.8 and 0.65–0.85).

By simply changing the ratio of the inner diameter of the hollow fiber to the outer diameter of the capillary, it was found, unexpectedly, that hollow fibers with a wide variety of permeability characteristics can be conveniently obtained without changing the composition of the casting solution.

Other features or advantages of the present invention will be apparent from the following detailed description of several embodiments, and also from the appending claims.

DESCRIPTION OF THE PREFERRED EMBODIMENTS

Set forth below is a more detailed characterization of each of the components of the casting solution of the present invention.

Polysulfone has been used in the manufacture of hemodialysis hollow fibers. E.g., see Table 1, Radovich "Composition of Polymer Membranes for Therapies of End-Stage Renal Disease" in Bonomoni et al. (eds), Dialysis Membranes: Structure and Predictions. Contrib. Neophrol. Basel, Karger, 1995, vol. 113, pp. 11–24. It has the following structure: (—Ph—$SO_2$—Ph—O—Ph—C($CH_3$)$_2$—Ph—O—)$_n$, where Ph stands for the divalent radical p-phenylene, and is commercially available (e.g., Amoco Chemicals; UDEL). Similar polymers such as polyarylsulfone, i.e., (—O—Ph—O—Ph—$SO_2$—Ph)$_m$—(O—Ph—$SO_2$—Ph—O—Ph—$SO_2$—Ph)$_n$, and polyethersulfone, i.e., (—Ph—$SO_2$—Ph—O—Ph—$SO_2$—Ph—O—)$_n$, can be used instead of polysulfone. Polyarylsulfone is also available from Amoco Chemicals (RADEL A). Polyethersulfone, on the other hand, can be obtained from Imperial Chemical Industries (ICI VICTREX/BASF ULTRASON). If desired, a combination of two or all three of polysulfone, polyethersulfone, and polyarylsulfone can be used in a casting solution of this invention.

A hydrophilic compatible polymer affects phase inversion rate during the spinning of the casting solution, as well as the pore size, porosity, and morphology of the hollow fiber thus formed. It must be hydrophilic so that it can be readily removed from the casting solution during and subsequent to the fiber formation. It must be compatible in the sense that, once dissolved in the casting solution, it does not react with other components in the casting solution. On the other hand, it also must contain 2–5 primary hydroxyl groups, i.e., —$CH_2OH$, which are first subjected to reaction with the —N=C=O groups of an isocyanate capped polyethylene glycol urethane polymer before the addition of all other components to form a casting solution. See Example i below. Examples of a hydrophilic compatible polymer include, but are not limited to, various polyethylene glycols of suitable M.W.'s.

An isocyanate capped polyethylene glycol urethane polymer used in the casting solution is an isocyanate capped polymer (i.e., 2–5 —N=C=O groups), which (1) contains several polyethylene glycol molecules cross-linked to each other via urethane linkage (i.e., —NH—CO—O— formed by the reaction between a —N=C=O group and a —OH group), and (2) has a M.W. of 500–5,000 daltons. Examples of such a polymer include, but are not limited to, Hypol FHP 2000, Hypol FHP 2002, and Hypol FHP 3000, all of which can be purchased from Hampshire Chemical Corp., Lexington, Mass. See Hypol Prepolymer—Introductory Guide, Hampshire Chemical Corp., Lexington, Mass. (1992).

The casting solution may also contain toluene diisocyanate (e.g, 2,4 or 2,6-diisocyanato toluene) in an amount which is less than 10% by weight (i.e., trace amount up to 10% by weight; preferably, less than 3% by weight) of the isocyanate capped polymer. No toluene diisocyanate is present in hollow fibers prepared from such a casting solution. Note that small amounts of this compound are present in Hypol FHP 2000, Hypol FHP 2002, and Hypol FHP 3000 as purchased.

As to the solvent, any aprotic and water miscible solvent that is capable of dissolving all other components of the casting solution and is chemically stable can be used. The solvent must be water miscible so that it can be washed out after hollow fiber formation. The term "solvent" used herein refers to both a single solvent and a mixture of two or more solvents. Examples of a suitable solvent include, but are not limited to, N-methyl pyrrolidone, dimethyl sulfoxide, dimethyl formamide, dimethyl acetamide, and 4-butyrolactone.

Referring to the spinnerets for practicing this invention, detailed descriptions and illustrative schemes can be found in U.S. Pat. No. 5,232,601 and Radovich "Composition of Polymer Membranes for Therapies of End-Stage Renal Disease" in Bonomoni et al., (eds), Dialysis Membranes: Structure and Predictions. Contrib. Neophrol. Basel, Karger, 1995, vol. 113, pp. 11–24.

The coagulating solution can be any solution which, upon contact with the casting solution, precipitates the polymers in the casting solution, e.g., a solution which contains 70–100% by weight water and 0–30% by weight a water-miscible solvent such as N-methyl pyrrolidone. A coagulation bath is to receive hollow fiber formed by spinning the casting solution, and can be pure water. A detailed description of how to spin a casting solution and relevant conditions under which the spinning process is conducted can be found in U.S. Pat. No. 5,232,601.

Procedures for evaluating and using a hollow-fiber based hemodialyzer can be found in the literature. E.g., see the guidelines published by the Association for the Advancement of Medical Instrumentation, or the International Standard Organization guidelines.

Without further elaboration, it is believed that one skilled in the art can, based on the description herein, utilize the present invention to its fullest extent. The following specific examples are, therefore, to be construed as merely illustrative, and not limitative of the remainder of the disclosure in any way whatsoever. Furthermore, all of the cited publications are incorporated by reference in their entirety.

EXAMPLE 1

Hypol FHP 2000 ("Hypol;" Hampshire Chemical Corp., Lexington, Mass.) and polyethylene glycol 600 ("PEG;" Dow Chemical Co., Midland, Mich.) were mixed at a weight ratio of Hypol/PEG =2/1 at 46°–53° C. for 1.1–2.4 hours. The mixture was then immediately blended with a solution which contained polysulfone Udel 1700 ("PSF;" Amoco Chemicals, Chicago, Ill.), N-methyl pyrrolidone ("NMP;" ISP Technologies Inc., Wayne, N.J.), and PEG at ambient temperature to form a casting solution having a weight % ratio of PSF/PEG/Hypol/NMP =23/14/2/61. The casting solution had a viscosity of 4900 cp at 45° C.

Hollow fibers were then spun at 250 ft/min at 65° C. using the casting solution through a spinneret for hollow fibers while introducing through the center capillary of the spinneret pure water which functioned as a coagulating solution. The ratio of the internal diameter of the fiber ("FID") to the outer diameter of the capillary ("COD") was 0.727. The flow rates of the casting solution and the coagulating solution were estimated to be about 2.6 ml/min and about 2.4 ml/min, respectively. The hollow fibers thus obtained had an internal diameter of 202 μm and a wall thickness of 44 μm.

After the fibers were spun, they were collected into bundles and immersed in water (i.e., a coagulation bath) for 24 hours. The fiber bundles, upon immersion in a glycerine bath, were placed in a texturing apparatus to make a wave-like pattern onto the fibers, which were subsequently potted into a plastic dialyzer device (typically containing 3700–3800 fibers each with a length of about 8 inches, and having an internal active surface area of about 0.5 $m^2$) for evaluations of both bovine serum ultrafiltration and saline clearance.

The bovine serum ultrafiltration coefficient was determined as follows: A dialyzer was kept in a vertical position. 1000 ml of bovine serum was filtered through 0.2 μm sterile filters and placed in a beaker. The serum (total protein =~8.0 g/dL), which was kept at ~37° C., was pumped through the blood side of the dialyzer. The blood inlet flow rate ("$Q_{bi}$") was set at 200 ml/min. The ultrafiltrate fluid and serum that exited from the dialysate and blood sides, respectively, was returned back to the beaker containing the serum in a recirculating fashion. The blood outlet line was partially clamped to achieve a positive ultrafiltration, with the transmembrane pressure ("TMP") kept at no higher than 3 psi. After a 30-minute stabilization period under these conditions, the clamp on the blood outlet line was then adjusted to achieve six evenly-spaced data points of the ultrafiltration rate ("$Q_f$") versus those of the TMP. The serum ultrafiltration coefficient, or Kuf, was calculated from the slope of the best-fit line through these points and reported in units of ml/hr/mm Hg/m$^2$ after normalization by the dialyzer membrane active surface area. The bovine serum ultrafiltration coefficient of the hollow fiber thus prepared was determined to be 4.9 ml/hr/mm Hg/m$^2$.

Saline clearance measurements were performed with a $Q_{bi}$ of 200 ml/min (9 g/L saline solution), a $Q_f$ of 0 ml/min, and a $Q_{di}$ (dialysate inlet flow rate) of 500 ml/min (water). The temperatures of both the saline and the water were maintained at 37.0°±2.0° C. The saline clearance rate of the dialyzer device thus prepared was determined to be 123 ml/min.

EXAMPLE 2

Hollow fibers were prepared, processed, and evaluated in manners identical to those described in Example 1 except that (1) the ratio of FID/COD was maintained at 0.773; (2) the flow rate of the casting solution was estimated to be about 1.6 ml/min; and (3) the flow rate of the coagulating solution was estimated to be about 1.5 ml/min.

The hollow fibers thus obtained had an internal diameter of 204 μm and a wall thickness of 45 μm. The bovine serum ultrafiltration coefficient and the saline clearance rate of the hollow fiber were determined to be 12.2 ml/hr/mm Hg/m$^2$ and 120 ml/min, respectively.

EXAMPLE 3

Hollow fibers were prepared, processed, and evaluated in manners identical to those described in Example 1 except that (1) the ratio of PSF/PEG/Hypol/NMP was 23/14/1/63 (viscosity 3100 CP AT 45° C); (2) the ratio of FID/COD was maintained at 0.727; (3) the flow rate of the casting solution was estimated to be about 2.7 ml/min; and (4) the flow rate of the coagulating solution was estimated to be about 2.5 ml/min.

The hollow fibers thus obtained had an internal diameter of 205 μm and a wall thickness of 45 μm. The bovine serum ultrafiltration coefficient and the saline clearance rate of the hollow fiber were determined to be 7.5 ml/hr/mm Hg/m$^2$ and 130 ml/min, respectively.

EXAMPLE 4

A dialyzer device, which contained a bundle of hollow fibers prepared and processed in manners similar to those described in Example 1, was tested for its bovine serum ultrafiltration coefficient and saline clearance rate (dialyzer active surface area=0.5 m$^2$, $Q_{bi}$=200 ml/min, $Q_f$=0 ml/min, and $Q_{di}$=500 ml/min), and then subjected to repeated cycles of fouling with serum, washing, and testing.

The dialyzer device was washed as follows: The device was thoroughly rinsed with water on both blood and dialysate sides. After draining of the water, a 0.25% (weight %) sodium hypochlorite solution, heated to 37° C., was recirculated throughout the blood side of the device for minutes at a TMP of 150 mm Hg. The device was then rinsed thoroughly with deionized water until all traces of sodium hypochlorite were gone.

Repeated fouling with bovine serum and washing, i.e., repeated reuse, up to nine times did not significantly affect the saline clearance rate and the bovine serum ultrafiltration coefficient as shown in the table below:

| Reuse No. | Saline Clearance* | Bovine Serum Kuf† |
|---|---|---|
| 0 | 129 | 4.10 |
| 1 | 128 | 4.02 |
| 2 | 128 | 4.08 |
| 3 | 132 | 4.80 |
| 4 | 127 | 3.93 |
| 5 | 130 | 3.91 |
| 6 | 126 | 3.28 |
| 7 | 128 | 3.80 |
| 8 | 128 | 3.91 |
| 9 | 128 | 4.11 |

*in ml/min; dialyzer active surface area = 0.5 m$^2$,
†$Q_{bi}$ = 200 ml/min, $Q_f$ = 0 ml/min, and $Q_{di}$ = 500 ml/min in ml/hr/mm Hg/m$^2$

EXAMPLE 5

Hollow fibers were prepared in a manner analogous to that described in Example 1, employing the same casting solution (i.e., PSF/PEG/Hypol/NMP=23/14/2/61) with various FID/COD ratios (ranging from 0.687 to 0.750) at a spin rate of 250 ft/min. The hollow fibers thus obtained, after autoclaving at 121° C. for 45 min, were tested for their bovine serum ultrafiltration coefficients. The results are shown in the table below:

| FID* | COD* | FID/COD | Bovine Serum Kuf† |
|---|---|---|---|
| 208 | 303 | 0.687 | 2.8 |
| 212 | 303 | 0.700 | 3.2 |
| 214 | 303 | 0.706 | 3.8 |
| 218 | 303 | 0.720 | 3.8 |
| 199 | 275 | 0.724 | 5.0 |
| 200 | 275 | 0.727 | 4.6 |
| 201 | 275 | 0.731 | 5.0 |
| 218 | 292 | 0.747 | 5.3 |
| 291 | 292 | 0.750 | 5.9 |

*in microns
†in ml/hr/mm Hg/m$^2$

Thus, the higher the FID/COD ratio, the higher the ultrafiltration coefficient of the fiber. Indeed, the ratio of FID/COD as a function of ultrafiltration coefficient can be determined for different casting solution compositions and spinning conditions. For the casting solution used in this example at a spin rate of 250 ft/min, the following equation applies:

$$Y=0.6366+0.01935 X$$

where
Y=FID/COD
X=bovine serum ultrafiltration coefficient (ml/hr/mm Hg/m$^2$)

Based on the above equation, the ultrafiltration coefficient of the fiber is predictable and therefore controllable.

OTHER EMBODIMENTS

From the above description, one skilled in the art can easily ascertain the essential characteristics of the present invention, and without departing from the spirit and scope thereof, can make various changes and modifications of the invention to adapt it to various usages and conditions. Thus, other embodiments are also within the claims.

What is claimed is:

1. A casting solution for preparing a low to medium flux membrane, said casting solution comprising 19–25% by weight polysulfone, polyethersulfone, or polyarylsulfone; 14–32% by weight a hydrophilic compatible polymer; 0.1–6% by weight an isocyanate capped polyethylene glycol urethane polymer; and 37–67% by weight an aprotic and water miscible solvent; wherein said polysulfone, polyethersulfone, or polyarylsulfone has a M.W. of 10,000–100,000 daltons, said isocyanate capped polymer contains 2–5 —N=C=O groups per molecule and has a M.W. of 500–5,000 daltons, and said compatible polymer contains 2–5 —CH$_2$OH groups per molecule and has a M.W. of 200–1,000 daltons.

2. The casting solution of claim 1, wherein said casting solution comprises 22–24% by weight polysulfone, polyethersulfone, or polyarylsulfone; and 38–64% by weight an aprotic and water miscible solvent.

3. The casting solution of claim 2, wherein said casting solution comprises 22–24% by weight polysulfone.

4. The casting solution of claim 1, further comprising toluene diisocyanate in an amount which is less than 10% by weight said isocyanate capped polymer.

5. The casting solution of claim 4, wherein said toluene diisocyanate is in an amount less than 3% by weight said isocyanate capped polymer.

6. The casting solution of claim 5, wherein said casting solution comprises 22–24% by weight polysulfone and 38–64% by weight an aprotic and water miscible solvent.

7. The casting solution of claim 6, wherein said polysulfone has a M.W. of 30,000–80,000 daltons, said isocyanate capped polymer contains 2–3 —N=C=O groups per molecule and has a M.W. of 1,000–2,000 daltons, and said hydrophilic compatible polymer contains 2–3 —CH$_2$OH groups per molecule and has a M.W. of 400–800 daltons.

8. The casting solution of claim 7, wherein said polysulfone has a M.W. of about 60,000 daltons, said isocyanate capped polymer is prepared from polyethylene glycol and toluene diisocyanate and has a M.W. of about 1,400 daltons, and said hydrophilic compatible polymer is polyethylene glycol and has a M.W. of about 600 daltons.

9. The casting solution of claim 8, wherein said solvent is selected from the group consisting of N-methyl pyrrolidone, dimethyl sulfoxide, dimethyl formamide, dimethyl acetamide, and 4-butyrolactone.

10. The casting solution of claim 6, wherein said casting solution has a viscosity of 2,000 to 10,000 cp at 45° C.

11. The casting solution of claim 10, wherein said casting solution has a viscosity of 2,500 to 6,000 cp at 45° C.

12. The casting solution of claim 7, wherein said casting solution has a viscosity of 2,500 to 6,000 cp at 45° C.

13. The casting solution of claim 8, wherein said casting solution has a viscosity of 2,500 to 6,000 cp at 45° C.

14. The casting solution of claim 9, wherein said casting solution has a viscosity of 2,500 to 6,000 cp at 45° C.

* * * * *